United States Patent
Koskinen et al.

(10) Patent No.: US 6,187,901 B1
(45) Date of Patent: Feb. 13, 2001

(54) METHOD FOR THE REMOVAL AND RECOVERY OF LACTIDE FROM POLYLACTIDE

(75) Inventors: Jukka Koskinen, Espoo; Johan-Fredrik Selin, Helsinki; Nikitas Katsaras, Porvoo; Kari Kaariainen, Vantaa, all of (FI)

(73) Assignee: Fortum Oil and Gas Oy, Espoo (FI)

( * ) Notice: Under 35 U.S.C. 154(b), the term of this patent shall be extended for 0 days.

(21) Appl. No.: 09/367,381

(22) PCT Filed: Feb. 13, 1998

(86) PCT No.: PCT/FI98/00139

§ 371 Date: Aug. 13, 1999

§ 102(e) Date: Aug. 13, 1999

(87) PCT Pub. No.: WO98/36012

PCT Pub. Date: Aug. 20, 1998

(30) Foreign Application Priority Data

Feb. 14, 1997 (FI) .......................................... 970649
Feb. 14, 1997 (FI) .......................................... 970650

(51) Int. Cl.[7] .............................. C08G 63/08; C08J 11/04
(52) U.S. Cl. ........................ 528/483; 528/354; 528/490; 528/501; 528/503; 521/45
(58) Field of Search ..................................... 528/483, 354, 528/490, 501, 503; 521/45

(56) References Cited

U.S. PATENT DOCUMENTS 5,378,801   1/1995   Reichert et al. .

FOREIGN PATENT DOCUMENTS

| 0499747A2 | 12/1991 | (EP) . |
| 0664309A2 | 7/1995 | (EP) . |
| 0755956A2 | 1/1997 | (EP) . |

*Primary Examiner*—Duc Truong
(74) *Attorney, Agent, or Firm*—Birch, Stewart, Kolasch & Birch LLP

(57) ABSTRACT

The invention relates to a method for the removal of lactide from polylactide and recovery of lactide from a lactide-containing gas by cooling the hot lactide-containing gas, wherein a polymer melt traveling through a nozzle forms thin threads the surface area of which is so large that in a normal-pressure or vacuum evaporator the lactide evaporates from the polymer rapidly into a hot carrier-gas flow and the polymer settles under gravity onto a collecting device. A hot lactide-containing gas is cooled rapidly to a temperature below 100° C., whereupon the lactide crystallizes from gas, forming lactide crystals, which are separated from the gas.

18 Claims, 2 Drawing Sheets

METHOD FOR THE REMOVAL AND RECOVERY OF LACTIDE FROM POLYLACTIDE

This application is the national phase under 35 U.S.C. §371 of PCT International Application No. PCT/FI98/00139 which has an International filing date of Feb. 13, 1998 which designated the United States of America.

FIELD OF THE INVENTION

The invention relates to the removal of lactide from polylactide by ensuring effective material transfer during evaporation and relates to the recovery of lactide from the process for the preparation of polylactide.

DISCUSSION OF RELATED ART

In recent years, interest in biodegradable polymers, i.e. biopolymers, has greatly increased, and many companies have made efforts to launch on the market packaging materials, hygiene products, sacks and films for agricultural purposes, and sacks for waste. In particular, various films have gained importance. The use of polymers of lactic acid in these applications has so far been limited by the high price of the polymers and their susceptibility to breaking down during technical processing.

Polyhydroxy acids can be prepared by polycondensation reactions, which are typical in the preparation of polyesters, or by ring-opening polymerization from cyclic lactones. Polyhydroxy acids are thermoplastic polyesters which resemble many conventional polymers.

Polylactides, or condensation polymers based on lactic acid, are for many reasons especially attractive, since their principal degradation product, lactic acid, is a product common in nature, it is not toxic and is used widely in the food and pharmaceutical industries. A high molecular weight polymer can best be produced by ring-opening polymerization from the dilactone, also called lactide. Lactic acid is optically active, and thus its dimer appears in four different forms: L,L-lactide; D,D-lactide; L,D-lactide (mesolactide); and a racemic mixture of L,L- and D,D-lactides. By polymerizing these either as pure compounds or at different blend proportions, polymers are obtained which have different stereochemical structures affecting their resilience and crystallinity and, consequently, also their mechanical and thermal properties. The obtained polymers are usually hard and optically bright.

The ring-opening polymerization of cyclic lactones of hydroxy acids, such as lactide, glycolide, epsilon-caprolactone, etc., constitutes technology known per se. The polymerization processes known are various, some examples being U.S. Pat. No. 5,378,801 relating to extrusion polymerization, patent publication EP 0 664 309-A relating to two-step polymerization, and patent publication EP 0 499 747-A describing polymerization in a mixing reactor.

DETAILED DESCRIPTION OF THE INVENTION

Figure 1:
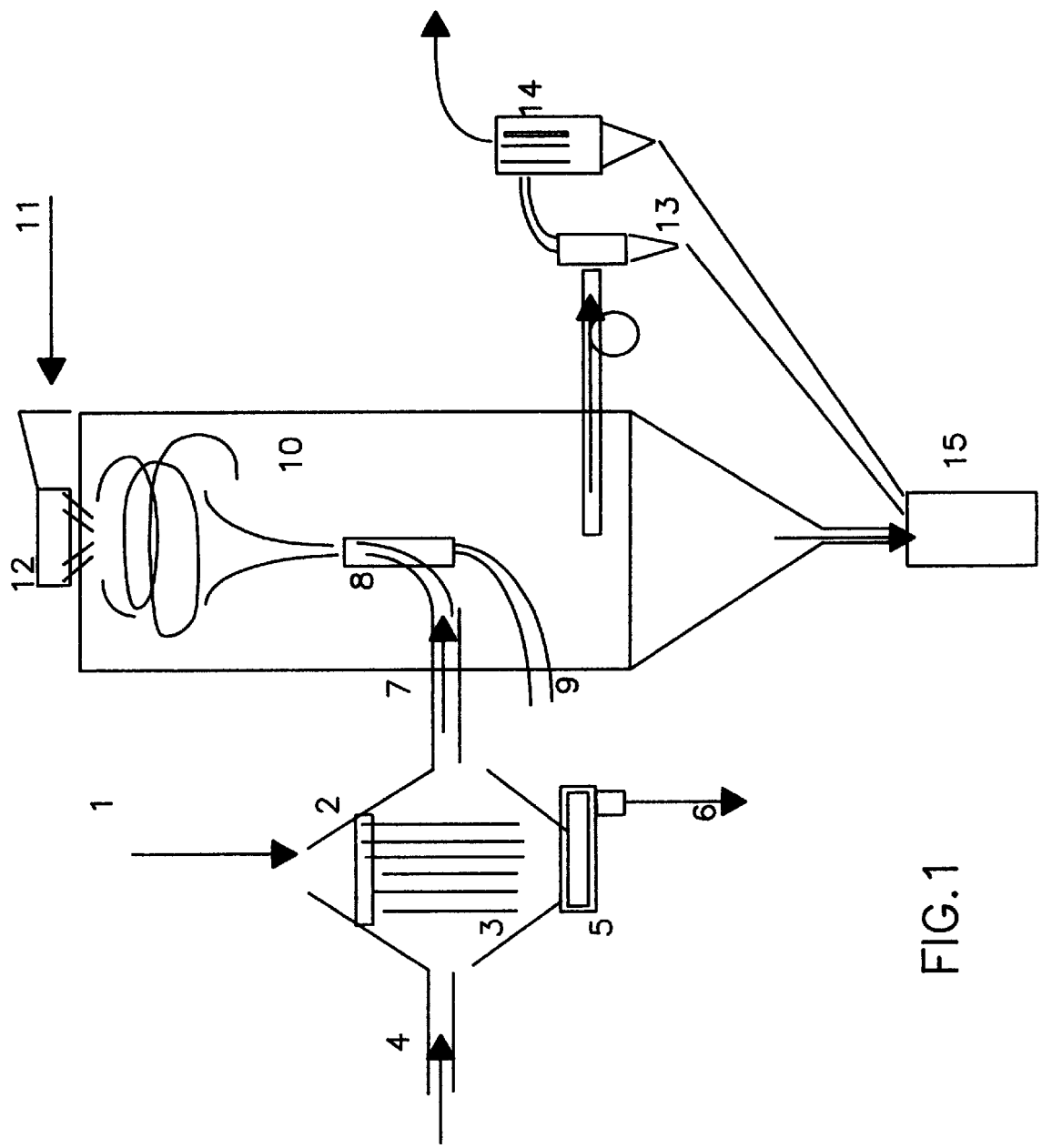
FIG. 1 is a process diagram of an embodiment of the invention.

The polymer or copolymer according to the present invention can be prepared from L-lactide, D-lactide or D,L-lactide, or blends thereof, by any polymerization process, batch, semi-continuous or continuous. Continuous polymerization can be carried out advantageously by polymerization in an extruder. The polymer is produced by heating the monomer or the monomer blend to produce a homogeneous melt and by adding a catalyst in order to polymerize the lactide, whereupon the ring opens. The molar mass ($M_w$) of the polymer is approximately 20000–500000, preferably 40000–300000. Preferably the polymer is prepared from L-lactide.

The polymer is upon formation in equilibrium with its monomer, lactide. This has sometimes also been viewed as being advantageous, since monomers and oligomers may act as polymer plasticizers. However, it also leads to rapid hydrolysis and causes problems of adhesion in the processing of the polymer. Furthermore, the presence of monomer lowers the thermal stability during melt processing. If conventional products to be produced by melt processing are aimed at, the residual monomer must be removed from the polymer. An acceptable monomer concentration is below 2% by weight, preferably below 1% by weight.

The lactide can be removed from the polymer by extraction or by evaporation from the polymer melt. In evaporation, there is the problem of too long evaporation times, in which case the polymer begins to break down. Evaporation methods are listed in patent application EP 0 499 747-A. These methods include the removal of lactide under a vacuum by evaporation from falling polylactide threads, thin film evaporation, and the use of a vacuumized extruder-type evaporator.

In a vacuumized extruder, evaporation is ineffective owing to a poor transfer of material when the capacity is even slightly higher.

In order to melt process the polymer, the polymer must usually first be stabilized. A preferred stabilizing method ref. Patent FI99124 is reactive extrusion with peroxy compounds, whereby the melt strength of the polymer is increased, and no stabilization agent residues are left in the polymer. The stabilized polymer material can be used for preparing products by conventional melt-processing methods, for example films by the blowing method, or the polymer may also be used for making flat films or sheets, or other products.

It has been found out that an efficient method for the removal of lactide from polylactide and recovery of lactide from a lactide-containing gas is obtained when a polymer melt traveling through a nozzle forms thin threads the surface area of which is so large that in a normal-pressure or vacuum evaporator the lactide evaporates from the polymer rapidly into a hot carrier-gas flow and the polymer settles under gravity onto a collecting device and a hot lactide-containing gas is cooled rapidly to a temperature below 100° C., whereupon the lactide crystallizes from gas, forming lactide crystals, which are separated from the gas.

According to the invention, the polymer melt is fed through a nozzle, whereby it is fibrillated into thin threads, and the lactide evaporates rapidly into a hot evaporation-gas flow from the outer surface of the formed threads. It is essential in the invention that the threads, sufficiently thin, fall under gravity, and under the laminar flow thereby formed the polymer melt will flow more rapidly in the inner parts of the thread than in the surface part. Thereupon the polymer melt flowing in the inner part of a sufficiently thin thread will form, when flowing downwards, a new material transfer surface for lactide evaporation.

A preferred embodiment of the invention is depicted in FIG. 1. According to it, the polymer melt coming from the polymerization (1) apparatus is fed by means of a melt pump into a nozzle part (2), which may be, for example, of the perforated sheet type. In the nozzle the melt is compressed into numerous threads the overall circumference of which is maximal in order to maximize the surface area of the forming threads during the evaporation. In the normal-pressure or vacuum drier (3) according to the figure, preferably cylindrical, lactide evaporates rapidly into the hot carrier gas flow (4) from the outer surface of the threads formed.

According to the invention it is essential that the size of the nozzle perforations is sufficiently small; a suitable perforation diameter is 0.1–1.0 mm, preferably 0.2–0.3 mm.

Commonly in the removal of lactide by evaporation there is the problem of polymer degradation. By the method according to the invention, degradation is prevented, since owing to the effective transfer of material the evaporation time is sufficiently short. The retention time of the polymer melt in the apparatus according to the invention is typically less than 10 s, preferably less than 5 s.

The evaporation gas is directed into the evaporator through a net, perforated sheets, or the like, in order to achieve an even distribution of the drying gas. The velocity of the gas relative to the melt threads is approx. 0.5–1 m/s, in order to achieve a sufficiently effective transfer of material. The evaporation gas must be hot and preferably dry, typically nitrogen or air, but other carrier gases can also be used. In the evaporation part the temperature is typically 150–300° C., preferably 220–260° C.

It has been observed experimentally that, if dry nitrogen is used as the evaporation gas, the temperature of the evaporation part may be above 250° C., the molecular weight and the molecular weight distribution of the polylactide still remaining constant.

The polymer melt threads settle under gravity on the collecting device, such as a cylinder, of the evaporation part, and from there the polymer melt is fed into a pelletizer. The collecting device (5) is preferably a heated cylinder having a rotational velocity suitable for collecting the settling polymer melt evenly on the cylinder surface, from which it is fed by means of a scraper to a pelletizing and/or stabilizing apparatus (6).

The retention time of the polymer melt on the collecting cylinder must also be short, preferably less than 1 min, in order to prevent degradation reactions of the polymer.

By the lactide removal method according to the present invention, a polymer is obtained having a lactide concentration of 0–4% by weight, preferably 0–2% by weight. The lactide concentration can be regulated by means of the temperature and the retention time in the evaporation part.

According to another preferred embodiment of the invention, the nozzle used is a film nozzle (2), in which case the polymer melt is fed as an even film onto a horizontally rotating drum, from where it is directed as a flowing melt film into the evaporation part (3) and from there to the lactide (10) and polymer recovery units (6), respectively.

In the evaporation part the evaporating lactide travels along with the drying gas to a lactide recovery unit (10), and the recovered lactide may be recycled to polymerization.

The lactide-containing gas mixture leaving the lactide evaporator (3) is cooled rapidly, whereupon the lactide crystallizes from gas. Typically the gas mixture (7) is directed to an ejector or a gas nozzle (8), to which cold air (9) is fed and sprayed into the crystallisation chamber (10). On entering the ejector the lactide gas has a temperature of 120–300° C., depending on the evaporation method. In the ejector the lactide-containing gas mixed with cold air is cooled to below 100° C., preferably to a temperature range of 20–40° C., whereupon it crystallizes from gas, forming small lactide crystals in the gas. Fresh air (11) is fed into the crystallisation chamber via gas distributer unit (12). The lactide powder is separated from the gas by cyclone (13) and filtration system (14). The lactide powder is collected from the crystallisation chamber (10), cyclone (13) and filtration unit (14) into the powder pot (15).

The lactide recovered by the method according to the invention is in powder form, and it is easy to handle and can be recycled to the polymerization process. The degree of purity of the recovered lactide is very high, and its optical structure is correct.

The yield with the recovery method is high, higher than 90%.

The process diagram of a preferred embodiment is shown in FIG. 1.

The invention is described further in greater detail with the help of the following examples.

EXAMPLE 1

The evaporation of lactide by the method according to the invention was investigated by varying the feed rates of the drying gas and the evaporation temperatures. The drying gas used in these experiments was dry air. The processing parameters used and the lactide concentrations in the obtained polylactide are shown in Table 1.

The rate of polymer fed into the evaporation apparatus was 5 kg/h; the temperature of the feed polymer was varied.

The polylactides (PLA) used had been prepared by extrusion polymerization, the manufacturer being Neste Oy.

TABLE 1

| PLA temperature ° C. | PLA lactide concentration % by weight | Drying temperature ° C. | Drying gas feed kg/h | Lactide concentration of product % by weight | Molecular weight of product (1000) |
|---|---|---|---|---|---|
| 205 | 13 | 160 | 12 | 3,8 | 107 |
| 215 | 15 | 180 | 12 | 3,0 | 101 |
| 205 | 15 | 180 | 12 | 2,7 | 100 |
| 215 | 13 | 200 | 12 | 1,7 | 106 |
| 215 | 10 | 210 | 12 | 1,3 | 103 |
| 215 | 9 | 210 | 7 | 0,0 | 100 |
| 215 | 7 | 220 | 12 | 0,8 | 100 |
| 205 | 12 | 230 | 12 | 2,3 | 107 |
| 215 | 13 | 180 | 12 | 2,2 | 104 |

EXAMPLE 2

The lactide used in the experiments had been recovered by evaporation after the L-lactide polymerization process.

Cold air was mixed in a gas mixer according to FIG. 1 with a lactide-containing gas having a temperature of 200°. The ratio of the cold air feed to the hot lactide-containing gas was 10 kg of feed air/kg of lactide-containing gas. The lactide crystallized completely in the form of powder in the cooled gas. The crystallized lactide powder was recovered by vibration from the chamber walls and by separating it from the air flow by filtration, whereafter it flowed freely into the lactide-collection container.

The yield of recovered lactide was over 90%.

Figure 2:
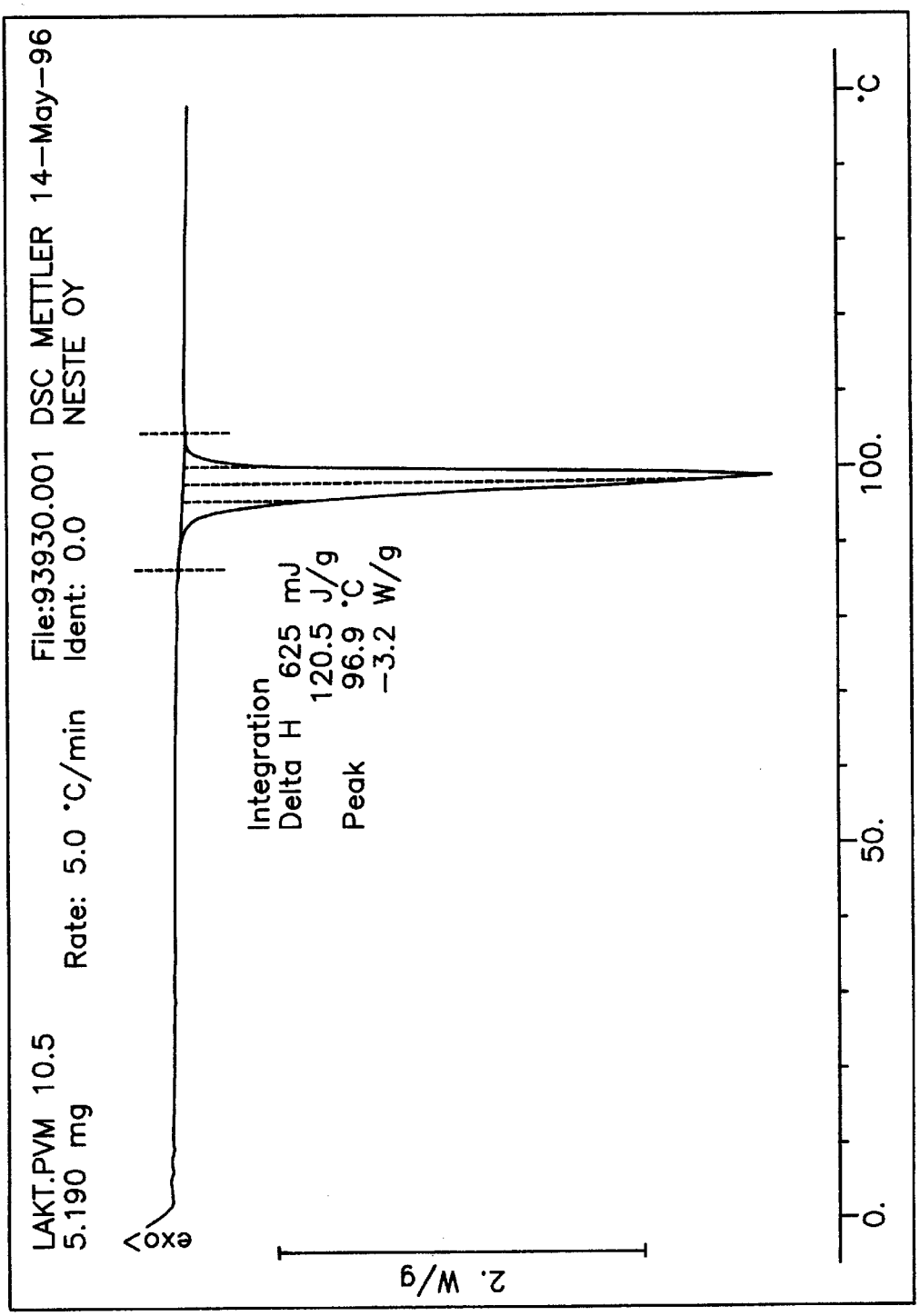
FIG. 2 is a DSC diagram showing the purity of the L-Lactide.

The separated lactide was analyzed by DSC analysis, and according to this analysis it was noted that the recovered lactide was pure L-lactide, and it had not been racemized during the evaporation and the recovery. FIG. 2 shows a DSC diagram showing the purity of the L-lactide.

If a copolymer of D-lactide and L-lactide is prepared, the recovered lactide is also a blend.

What is claimed is:

1. A method for the removal of lactide from polylactide which comprises evaporating and recovering lactide from a lactide containing gas, wherein a polymer melt traveling through a nozzle forms thin threads the surface area of which is so large that in normal-pressure or vacuum evaporators the lactide evaporates from the polymer rapidly into a hot carrier-gas flow and the polymer settles under gravity on a collecting device, and the hot lactide-containing gas is cooled rapidly in a crystallisation chamber to a temperature below 100° C., where upon the lactide crystallises from gas, forming lactide crystals, which are separated from the gas.

2. A method according to claim 1, wherein the nozzle is a perforated nozzle.

3. A method according to claim 1, wherein the diameter of the nozzle perforations is 0.1–1.0 mm.

4. A method according to claim 1, wherein the diameter of the nozzle perforations is 0.2–0.3 mm.

5. A method according to claim 1, wherein the nozzle is a film nozzle.

6. A method according to claim 1, wherein the evaporation gas used is hot nitrogen or air.

7. A method according to claim 1, wherein the velocity of the drying gas relative to the melt threads is approx. 0.5–1 m/s.

8. A method according to claim 1, wherein the retention time of the polymer melt in the dryer is less than 10 s.

9. A method according to claim 1, wherein during evaporation the temperature is 150–300° C.

10. A method according to claim 1, wherein the cooling is carried out by directing the gas mixture to a gas mixer to which cold air is fed simultaneously.

11. A method according to claim 1, wherein the gas mixture is cooled to a temperature of 20–40° C.

12. A method according to claim 1, wherein the mixture of crystallized lactide and gas is sprayed into a crystallization chamber, where the lactide crystallizes.

13. A method according to claim 1, wherein the crystallized lactide is separated by filtration.

14. A method according to claim 1, wherein the recovered lactide is so pure at it can be recycled directly to the process.

15. A polylactide from which lactide has been removed by a method according to claim 1 so that the concentration of lactide in the polymer is less than 4% by weight.

16. A method according to claim 1, wherein the retention time of the polymer melt in the dryer is less than 5 s.

17. A method according to claim 1, where during evaporation the temperature is 200–260° C.

18. A polylactide from which lactide has been removed by a method according to claim 1, so that the concentration of lactide in the polymer is less than 2% by weight.

* * * * *